United States Patent [19]
Anthony et al.

[11] Patent Number: 5,219,206
[45] Date of Patent: Jun. 15, 1993

[54] AUTOMATIC LOCKING TETHER FOR VEHICLE SEAT

[75] Inventors: James R. Anthony, Carmel; Harold G. Wallen; David D. Merrick, both of Indianapolis, all of Ind.

[73] Assignee: Indiana Mills & Manufacturing, Inc., Westfield, Ind.

[21] Appl. No.: 823,851

[22] Filed: Jan. 22, 1992

[51] Int. Cl.⁵ ............................................. B60R 21/00
[52] U.S. Cl. .................................. 297/473; 297/480; 280/801 R; 296/68.1
[58] Field of Search ................. 280/801, 805, 806; 297/216, 473, 476, 479, 478, 480; 296/68.1

[56] References Cited

U.S. PATENT DOCUMENTS

| | | | |
|---|---|---|---|
| 4,225,184 | 9/1980 | Strowick | 297/468 |
| 4,229,041 | 10/1980 | Werner | 297/468 |
| 4,239,260 | 12/1980 | Hollowell | 297/473 |
| 4,488,754 | 12/1984 | Hoesch et al. | 297/216 |
| 5,015,010 | 5/1991 | Homeier et al. | 280/808 |

FOREIGN PATENT DOCUMENTS 3813557 11/1989 Fed. Rep. of Germany.
0065925 5/1979 Japan .................................. 280/801
0033549 2/1983 Japan .................................. 280/801

Primary Examiner—Margaret A. Focarino
Assistant Examiner—Paul Dickson
Attorney, Agent, or Firm—Woodard, Emhardt, Naughton, Moriarty & McNett

[57] ABSTRACT

A passenger restraint with an automatic locking tether. A three point belt assembly includes a retractor mounted to the vehicle with the belt extendable therefrom having an outer end attached to a bracket movably mounted to a first automatic locking tether. A buckle mounted to the opposite side of the seat is movably mounted to a second automatic locking tether secured to the seat. Both tethers include a cam member pivotally mounted thereto having a locking pad movable against a web extending into the tether. One end of the web is fastened to the vehicle floor whereas the opposite end of the web is attached to a spring biased reel. A spring urges the pad apart from the web allowing for vertical and horizontal adjustment of the seat. Passenger loading during a crash moves the cam member with pad against the web anchoring the tether and seat to the vehicle floor via the web.

13 Claims, 6 Drawing Sheets

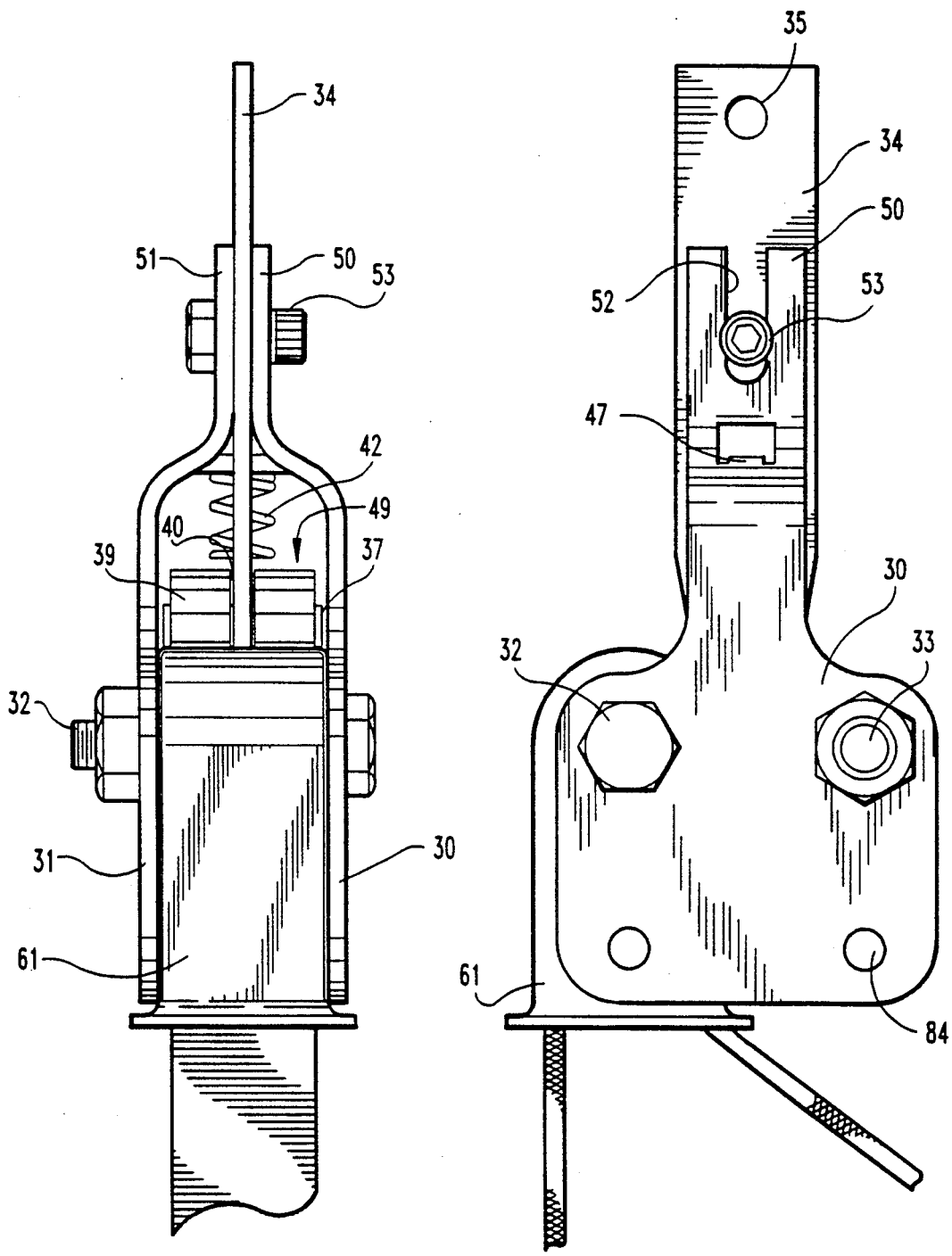

AUTOMATIC LOCKING TETHER FOR VEHICLE SEAT

BACKGROUND OF THE INVENTION

1. Field of the Invention:

This invention is in the field of passenger restraint systems with tethers for securing the vehicle seat.

2. Description of the Prior Art:

Three point restraint systems are used to secure a passenger within a vehicle seat. Typically, the system includes a seat belt extendable from a retractor with the outer end of the belt attached to one side of the seat. A tongue slidably mounted to the belt between the belt outer end and the retractor may then be pulled with the belt across the passenger and lockingly engage a buckle secured to the opposite side of the seat. In an emergency stop or crash, the retractor is operable to prevent further protraction of the belt thereby securing the passenger to the seat.

In an emergency stop or crash, the vehicle seat may pivot or move relative to the vehicle floor. Thus, in the event the passenger restraint system is mounted directly to the seat then the seat with passenger may move relative to the vehicle floor contacting conceivably against the vehicle. Likewise, in the event the restraint system is secured to the vehicle then force resulting from the seat moving relative to the vehicle will be directed against the passenger who is held by the belt. As a result, various tether systems have been incorporated to prevent or limit the motion of the seat relative to the vehicle during a crash. A typical tether includes a cable extending between the vehicle seat and frame. A disadvantage of such a tether is that the seat is no longer movable to allow for adjustment of the positioning of the seat. U.S. Pat. No. 4,488,754 issued to Max Heesch et al. addresses the problems inherent in a fixed tether by allowing the seat frame to normally slide along a horizontally extending wire cable during seat adjustment while having a clamp engaging the wire cable during a crash preventing movement of the seat frame relative to the vehicle floor. The clamp is activated during the crash when the seat occupant force is applied to the clamp via the seat belt. Such a mechanism allows for horizontal adjustment of the seat while providing a tether between the seat and vehicle floor; however, vertical adjustment of the seat is precluded.

Another approach to provide an adjustable tether is by mounting a belt retractor to the vehicle and attaching the outer end of the belt fixedly to the seat thereby allowing the seat to be moved during normal adjustment but preventing movement of the seat relative to the vehicle during a crash. Such a combination of retractor and seat is disclosed in the commonly owned U.S. Pat. No. 5,015,010 issued to Homeier et al.

The U.S. Pat. No. 4,225,184 issued to Strowick discloses an anchoring arrangement for a safety belt located on a vehicle seat which is both vertically and longitudinally adjustable relative to the vehicle. The clamping force is achieved by a plurality of intermeshing gears activated by passenger force on the belt. Another approach is disclosed in the U.S. Pat. No. 4,229,041 issued to Werner wherein a plate is pivoted by passenger belt force against a guide rail which allows for adjustable movement of the seat. Yet a further design is disclosed in the U.S. Pat. No. 4,248,480 issued to Koucky et al. The Koucky et al design has a lever pivoted by passenger belt force against a rack fixed to the vehicle. It is known to attach a cable wound on a reel fixed to the vehicle with the outer end of the cable fixed to the back portion of the seat, such as shown in the German Offenlegungsschrift DE 3813557 A1.

Disclosed herein is an automatic locking tether which includes many of the advantages of the separate tethers previously described while having additional advantages. Our tether includes gripping means mounted to the seat which is lockingly engageable with a web extending upwardly from the vehicle. Normally, the gripper is not clamped to the web allowing for vertical and horizontal adjustment of the seat. The web gripper is triggered by buckle load resulting from passenger load or movement. The gripper is therefore immediately locked to the web which is taut eliminating activation of the lock at a source remote from the passenger such as at the location of the retractor.

SUMMARY OF THE INVENTION

One embodiment of the present invention is a passenger restraint with an automatic locking tether for a vehicle including a frame movable mountable within a vehicle and a vehicle seat mounted to the frame with a first side and a second side opposite from the first side. The seat and frame are horizontally and vertically adjustable relative to the vehicle. A belt mount is mounted to the frame adjacent the first side and a buckle is mounted to the frame adjacent the second side. A belt belt has a first end mounted to a retractor secured to the vehicle and an opposite end mounted to the belt mount. A tongue is adjustably mounted to the belt between the first end and the opposite end and is lockingly engageable with the buckle when the belt is protracted from the retractor and extended over the chest and lap of a passenger on the seat. First and second automatic locking tethers are mounted to the frame with the belt mount and buckle movably mounted respectively to the first and second automatic locking tethers and being mounted thereby to the frame. The tethers have a first and second web mounted to the vehicle and further have first and second gripping devices mounted to the frame respectively at the first side and second side operable to allow relative motion between the gripping devices and the webs when the seat is moved relative to the vehicle during seat adjustment but operable when the belt mount and buckle are moved relative to the tethers to grip the webs during an emergency stop holding the frame relative to the vehicle to isolate the passenger from seat force.

Another embodiment of the present invention is an automatic locking tether for a vehicle seat to isolate a passenger restrained on the seat by a seat belt from seat force during an emergency stop. The tether includes a tether frame mounted to the seat, a lock movable mounted to the tether frame and operable to lock to the seat belt restraining the passenger on the seat, a web mounted to the vehicle and extending to the tether frame, a gripping device mounted to the tether frame and operable when in an unlocked state to allow relative motion between the web and the tether frame when the seat is moved relative to the vehicle during seat adjustment but having a locked state when the lock moves relative to the tether frame during an emergency stop gripping the web and holding the seat relative to the frame isolating the passenger on the seat from seat force.

It is an object of the present invention to provide a passenger restraint system with an automatic locking tether for the vehicle seat.

Another object of the present invention is to provide an automatic locking belt tether for a vehicle seat which is activated by passenger load applied to the separate restraint system.

An additional object of the present invention is to provide an automatic locking tether for a vehicle seat which minimizes seat excursion during a crash.

Related objects and advantages of the present invention will be apparent from the following description.

BRIEF DESCRIPTION OF THE DRAWINGS

FIG. 3 is an enlarged side view of a portion of the automatic locking tether mounted to the seat of FIG. 1.

FIG. 4 is a side view of the mechanism of FIG. 3.

DESCRIPTION OF THE PREFERRED EMBODIMENTS

Figure 1:
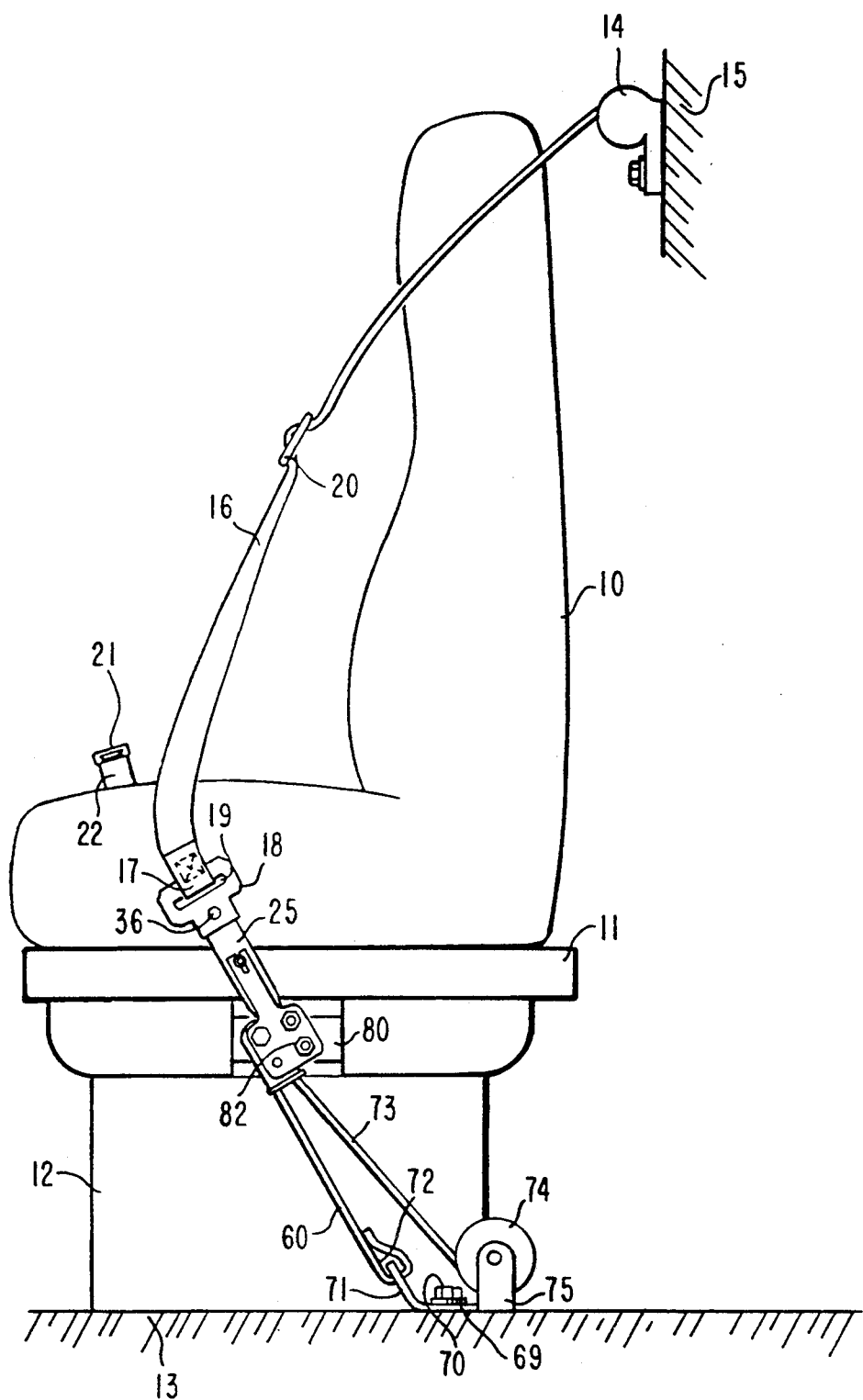
FIG. 1 is a side view of a vehicle seat incorporating the preferred embodiment of the invention disclosed herein.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
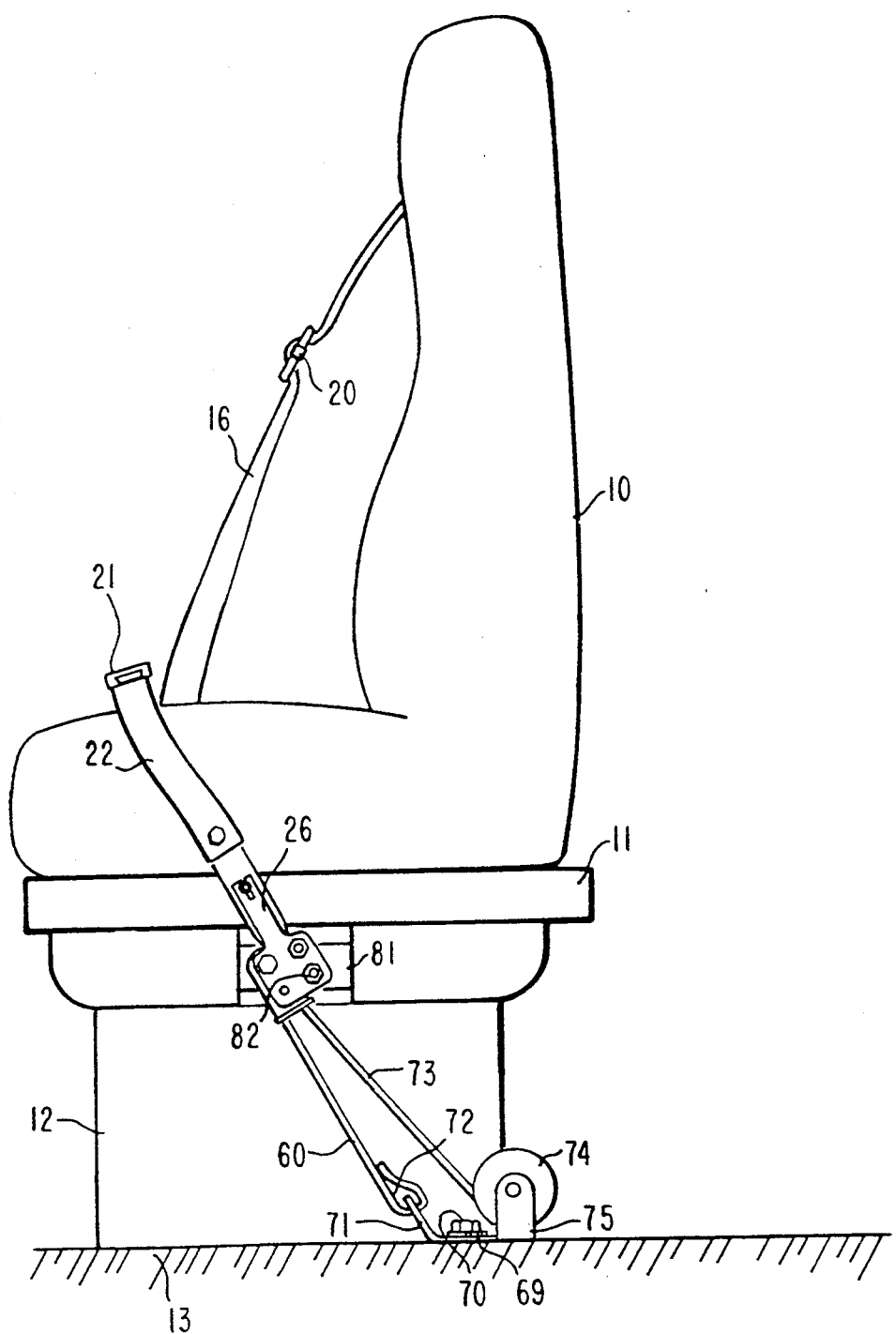
FIG. 2 is a side view of the opposite side of the seat of FIG. 1.

Referring now more particularly to FIGS. 1 and 2, there is shown a passenger seat 10 fixedly mounted atop a frame 11 in turn movably mounted atop frame 12 fixedly secured to the vehicle floor 13. Frame 11 is both horizontally and vertically movable relative to frame 12 to allow for adjustment of the location of the passenger. Structures are commonplace to allow for such vertical and horizontal movement with one such structure disclosed in U.S. Pat. No. 5,015,010 which is herewith incorporated by reference.

A three point passenger restraint system is provided and includes a conventional retractor 14 mounted to the vehicle sidewall 15. Alternatively, the retractor 14 may be mounted to the vehicle floor or onto the seat frame 11. Belt 16 extends outwardly from retractor 14 and has an outer end 17 fixedly secured to mounting bracket 18. Bracket 18 includes an aperture 19 through which the belt extends being doubled back and stitched to itself thereby fixedly securing the belt to bracket 18. A conventional seat belt tongue 20 is slidably mounted to belt 16 and is located between bracket 18 and retractor 14. The tongue with belt may be pulled outwardly across the lap and chest of the passenger resting upon seat 10 until tongue 20 is lockingly engaged with a conventional seat belt buckle 21 mounted to arm 22 in turn secured to and located on the side of the seat opposite bracket 18.

Bracket 18 is movably mounted to an automatic locking tether means 25 secured to frame 11 on one side of seat 10 whereas buckle 21 with arm 22 is movably mounted to a second automatic locking tether means 26 (FIG. 2) identical to tether means 25 but located on the opposite side of the seat and affixed to frame 11. Both tether means 25 and 26 include a web which is mounted to the vehicle floor. The tether means is operable when in an unlocked state to not grip the associated web thereby allowing for vertical and horizontal adjustment of the seat. In an emergency stop or crash condition, passenger load is applied to belt 16 causing bracket 18 and buckle 21 to move slightly outward thereby activating tether means 25 and 26 to lockingly engage the associated webs preventing relative motion between the seat frame and vehicle.

Tether means 25 will now be described it being understood that an identical description applies to tether means 26. Tether means 25 includes a pair of side plates 30 and 31 (FIGS. 3 and 4) fixedly secured together by a pair of conventional bolt/nut combinations 32 and 33 or rivets. A third plate 34 is slidably mounted to and between plates 30 and 31 having an outer distal end with an aperture 35 extending therethrough. A conventional fastening device such as a bolt/nut combination 36 (FIG. 1) extends through aperture 35 and fixedly secures the bottom end of mounting bracket 18 to plate 34. The opposite or inner end of plate 34 is mounted and secured by a pin 37 extending through a pivot cam member 38. The outer end 39 of cam member 38 is slotted providing a channel 40 (FIG. 4) into which the distal end of plate 34 extends allowing pin 37 to extend perpendicularly through channel 40 and through plate 34 thereby securing plate 34 to cam member 38 but allowing the distal end of plate 34 to pivot relative to end 39 of cam member 38. Bolt or rivet 33 extends through an aperture provided in cam member 38 thereby securing cam member 38 to the side plates 30 and 31 but allowing the cam member to pivot about the longitudinal axis of the bolt.

A center portion 41 of plate 34 is removed to locate spring 42 having one end 43 seated upon projection 44 of plate 34 extending into the spring. The opposite end 45 of the spring contacts a pair of arms 46 (FIG. 5) and 47 (FIG. 3) which extend inwardly respectively from plates 31 and 30 into the removed center portion 41 (FIG. 5) of plate 34. Arms 46 and 47 are formed by inwardly blending a portion of each plate 30 and 31 so that the arms extend inwardly into plate 34. Thus, plate 34 is movably mounted to plates 30 and 31 by means of pin 37 securing plate 34 to cam member 38 in turn secured by bolt 33 to the side plates 30 and 31. Spring 42 is operable to urge plate 34 inwardly in the direction of arrow 49 (FIG. 4) but yieldable to allow plate 34 to be pulled slightly outward by the force exerted by bracket 18 attached to the distal end of plate 34. The distal ends 50 and 51 of plates 30 and 31 include an open ended slot 52 to slidably received a guide pin or bolt 53 which prevents plate 34 from moving sideways thereby becoming misaligned or disengaging the narrowed outer ends 50 and 51 of the side plates. In the event a bolt 53 is used in lieu of a pin then the head of the bolt as well as the hexagonally shaped nut should not be tightened sufficiently to prevent motion of plate 34 in a direction of or opposite to arrow 49.

The aft end 54 (FIG. 5) of cam member 38 includes a concave surface 55 receiving the semi-cylindrical surface 56 of locking pad 57. Pad 57 includes a pin 58 extending therethrough terminating immediately inward of sidewalls 30 and 31. A pair of wire springs are located on the opposite sides of pad 57 extending around bolt 33 and pin 58 and being located between pad 57 and sidewall 30 and pad 57 and sidewall 31. One such wire spring 48 is shown is FIG. 5. The wire springs are operable to urge pad 57 upwardly against concave surface 55. The lower planar contact surface 59 includes a plurality of teeth formed thereon to frictionally engage the upper surface of web 60.

A web guide 61 includes an outer wall 62 spaced apart and connected to an inner wall 63 forming a channel 64 to guide web 60 immediately beneath pad 57. A rigid solid block 65 is located within the inner wall 63. Block 65 has an upwardly facing surface 66 located immediately beneath pad 57. The outer wall 62 and inner wall 63 is slotted immediately adjacent pad 57 to allow the pad to move downwardly forcing web 60 against surface 66 and preventing movement of the pad. Bolt combination 32 extends through block 65 thereby holding the block and guide to and between plates 30 and 31. Further, a pin 67 extends through the opposite end of the block and web guide and into the sidewalls 30 and 31 thereby further securing the block and web guide to the side walls. Alternatively, the web guide may be built into slide plates 30 and 31.

Web bracket 69 (FIG. 1) is fixedly mounted to a conventional fastening device, such as a bolt 70, to the vehicle floor 13. End 71 of bracket 69 is turned upwardly and is slotted receiving one end 72 of web 60. Web end 72 extends through the distal end of bracket 69 and is looped backward being stitched or otherwise secured to the main body of the web preventing the web from disengaging distal end 71. The opposite end 73 of the web is wound on a spring biased spool 74 rotatably mounted to a pair of unstanding arms 75 fixedly secured to bracket 69. Spool 74 includes a spring for urging the spool in a counter-clockwise direction as viewed in FIG. 1 to maintain web 60 in a taut condition. The spring within spool 74 however is yieldable to allow play-out of the web when the passenger seat is horizontally or vertically adjusted.

Web 60 extends upwardly from distal end 71 of bracket 69 and into web guide 61 passing beneath pad 57 and then exiting the web guide to spool 74. The aft end 76 (FIG. 5) of the web guide is flared to facilitate the entrance and exit of the web.

A pair of mounting brackets 80 (FIG. 1) and 81 (FIG. 2) are fixedly secured to the opposite sides of seat frame 11 and in turn have respectively automatic locking tethers 25 and 26 secured thereto. Conventional fastening devices such as bolts 82 extend through aperture 84 (FIG. 3) of each side plate thereby securing the locking tethers to the seat.

Figure 5:
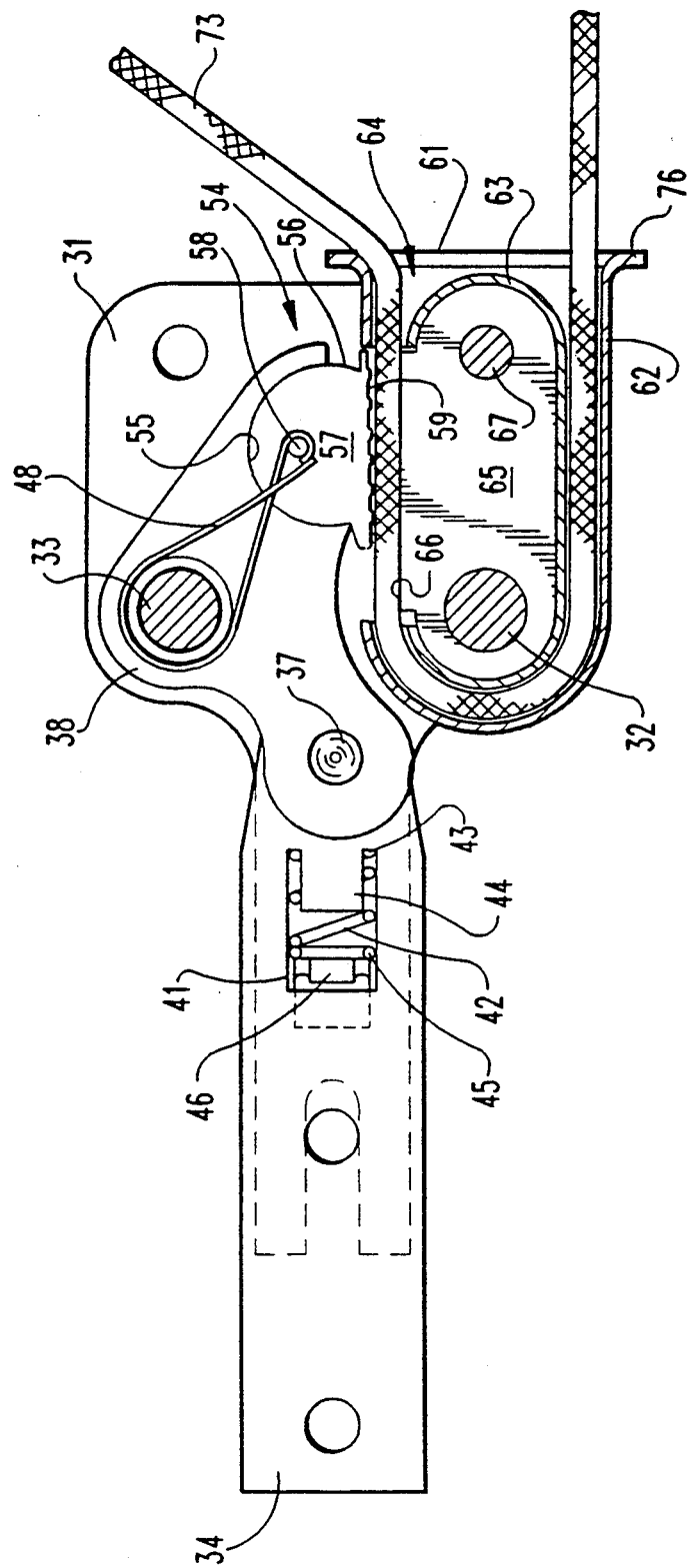
FIG. 5 is the same view as FIG. 3 only with one of the side plates removed.

Normally, spring 42 (FIG. 5) is operable to urge plate 34 inwardly with respect to side plates 30 and 31 thereby pivoting cam member 38 in a counter-clockwise direction as viewed in FIG. 5 with the wire springs urging pad 57 against concave surface 55 and apart from web 60. Thus, the locking tether may move along the length of web 60 to facilitate vertical and horizontal adjustment of the seat. Likewise, reel 74 is operable to maintain the web in a taut condition. In an emergency stop or crash condition, passenger load will be exerted against belt 16 with the passenger load then being transferred to buckle 21 and bracket 18 resulting in movement of both the buckle and bracket which in turn results in outward movement of plates 34 of the locking tethers causing springs 42 to compress. Outward movement of plates 34 results in clockwise movement of cam member 38 as viewed in FIG. 5 causing pad 57 to move downwardly with surface 59 engaging the outward surface of web 60 trapping the web between the pad and surface 66 of block 65 preventing movement of the locking tethers relative to webs 60. Thus, the locking tethers will be anchored via webs 60 to the vehicle floor. The locking tethers in turn mounted to the seat frame result in the anchoring of the seat frame and seat preventing relative motion between the seat and vehicle floor and isolating the passenger from seat force which could occur if the seat were to move relative to the vehicle.

Figure 6:
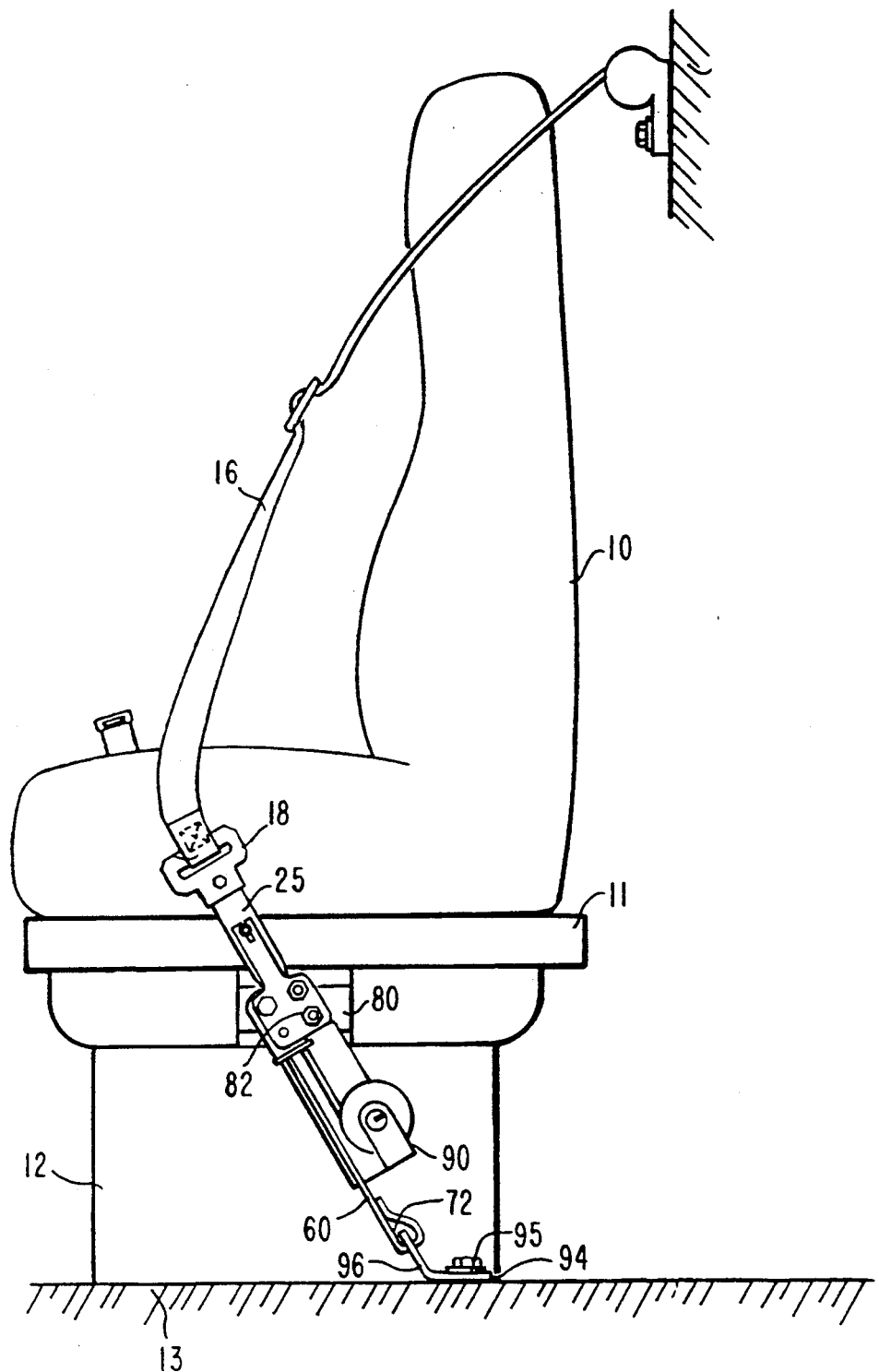
FIG. 6 is the same view as FIG. 1 only showing an alternate embodiment of the present invention.
Figure 7:
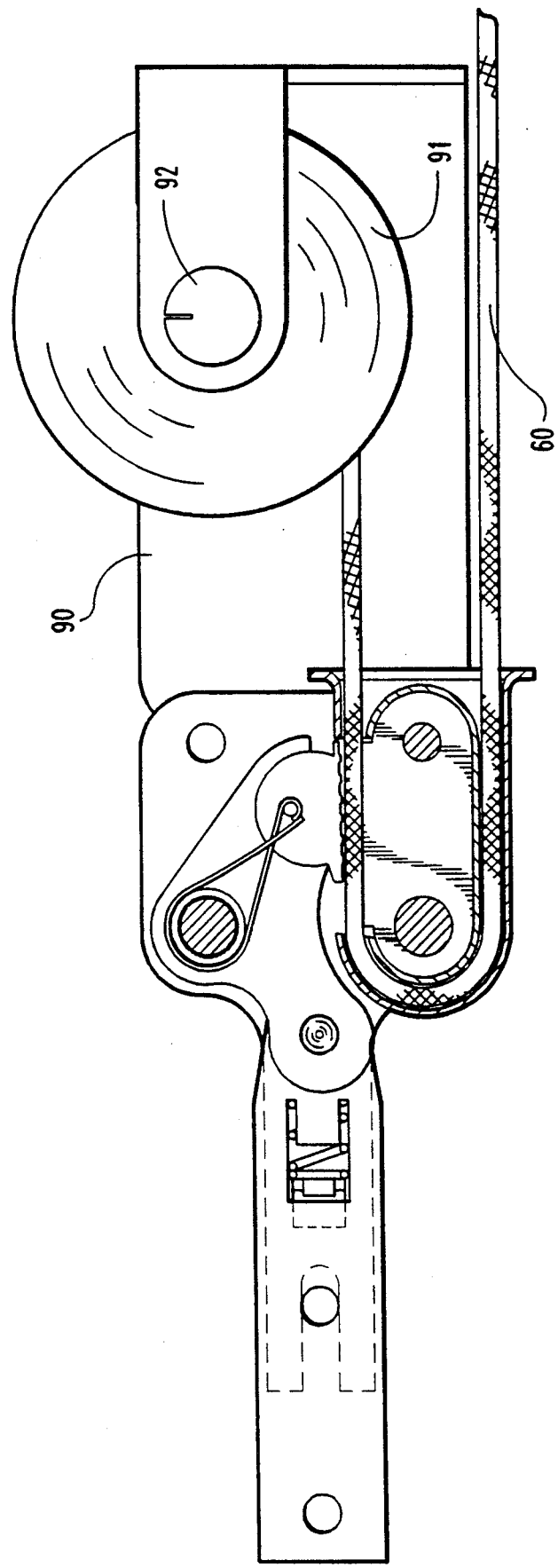
FIG. 7 is the same view as FIG. 5 only showing the alternate embodiment of FIG. 6.

Many variations are contemplated and included in the present invention. For example, reel 91 (FIGS. 6 & 7) may be rotatably mounted by axle 92 to an extension 90 of either or both side plates 30 and 31 with distal end 72 of web 60 secured to end 96 (FIG. 6) of the bracket 94 secured to the floor by bolt 95. Such an automatic tether shown in FIGS. 6 and 7 operates in the same manner and is constructed identically to that previously described with the exception of the location of the real. Thus, side plates include extensions 90 having a spring biased reel 91 rotatably mounted thereto by axle 92 with portion 93 of the web extending outwardly to the web guide and then back to the upwardly turned flange 96 of mounting bracket 94 secured by fastener 95 to the floor.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A passenger restraint with an automatic locking tether for a vehicle comprising:
    a frame movably mountable within a vehicle;
    a vehicle seat mounted to said frame and having a first side and a second side opposite from said first side, said seat and frame being horizontally and vertically adjustable relative to the vehicle;
    a seat belt retractor;
    a belt mount mounted to said frame adjacent said first side;
    a buckle mounted to said frame adjacent said second side;
    a belt having a first end mounted to said retractor and an opposite end mounted to said belt mount;
    a tongue adjustably mounted to said belt between said first end and said opposite end and lockingly engagable with said buckle when said belt is protracted from said retractor and extended over the chest and lap of a passenger on said seat;
    first automatic locking tether means mounted to said frame, said belt mount being movably mounted to said first automatic locking tether means and being mounted thereby to said frame, said first automatic locking tether means having a first web mounted to said vehicle and further having first gripping means mounted to said frame at said first side operable to allow relative motion between said first gripping means and said first web when said seat is moved relative to said vehicle during seat adjustment but operable when said belt mount is moved relative to said first automatic locking tether means to grip said first web during a crash, holding said frame relative to said vehicle to isolate said passenger from seat force; and, second automatic locking tether means mounted to said frame, said buckle being movably mounted to said second automatic locking tether means and being mounted thereby to said frame, said second automatic locking tether means having a second web mounted to said vehicle and further having second gripping means mounted to said frame at said second side operable to allow relative motion between said second gripping means and said second web when said seat is moved relative to said vehicle during seat adjustment but operable when said buckle is moved relative to said second automatic locking tether means to grip said second web during a crash holding said frame relative to said vehicle to isolate said passenger from seat force and wherein:

said first automatic locking tether means and said second automatic locking tether means include floor mounts fixedly secured respectively to said first web and said second web, said first web and said second web being flexible and taut and extending upwardly toward said frame;

said first automatic locking tether means and said second automatic locking tether means include spring biased reels each respectively receiving said first web and said second web and holding same in a taut condition, said spring biased reels being yieldable to allow said frame to be horizontally and vertically adjusted relative to said vehicle.

2. The passenger restraint of claim 1 wherein:
said first automatic locking tether means and said second automatic locking tether means include movable members attached to said belt mount and said buckle respectively, and further include fixed support surfaces and being operable when passenger load moves said buckle and said belt mount to force said movable members against said first web and said second web, holding same stationary relative to said fixed support surfaces and anchoring said frame to said vehicle.

3. The passenger restraint of claim 2 wherein:
said first automatic locking tether means and said second automatic locking tether means include spring means operable to normally hold said movable members apart from said first web and said second web, said spring means being yieldable to allow said movable members to lockingly engage said first web and said second web upon application of passenger load.

4. The passenger restraint of claim 1 wherein:
said reels and said retractor are mounted to the vehicle.

5. The passenger restraint of claim 1 wherein:
said reels are mounted to said seat.

6. A passenger restraint with an automatic locking tether for a vehicle comprising:
a belt;
a frame movably mountable within a vehicle;
a vehicle seat mounted to said frame;
first locking means mounted to said frame;
second locking means mounted to said belt and lockingly engagable with said first locking means when said belt is extended across a passenger on said seat;
automatic locking tether means mounted to said frame, said first locking means being movably mounted to said automatic locking tether means and being mounted thereby to said frame, said automatic locking tether means having a web mounted to said vehicle and further having gripping means mounted to said frame to allow relative motion between said gripping means and said web when said seat is moved relative to said vehicle during seat adjustment and operable when said first locking means is moved relative to said automatic locking tether means with said tether means gripping said web during a crash, holding said frame relative to said vehicle to isolate said passenger from seat force, and wherein;
said gripping means include a movably mounted pad and a support surface upon which said web is movable, said gripping means operable when said first locking means moves during a crash to move said pad against said web holding said web stationary against said support surface and limiting movement thereby between said frame and said vehicle,
said automatic locking tether means includes a tether frame secured to said seat frame and a cam member pivotally mounted thereto, said pad is movably mounted to said cam member to force said web against said support surface.

7. The passenger restraint of claim 6 wherein:
said tether means includes a web guide mounted to said tether frame receiving said web and directing said web between said support surface and said pad, said web guide includes a cam surface upon which said cam member moves and is directed.

8. A passenger restraint with an automatic locking tether for a vehicle comprising:
a belt;
a frame movably mountable within a vehicle;
a vehicle seat mounted to said frame;
first locking means mounted to said frame;
second locking means mounted to said belt and lockingly engagable with said first locking means when said belt is extended across a passenger on said seat; and,
automatic locking tether means mounted to said frame, said first locking means being movably mounted to said automatic locking tether means and being mounted thereby to said frame, said automatic locking tether means having a web mounted to said vehicle and further having gripping means mounted to said frame to allow relative motion between said gripping means and said web when said seat is moved relative to said vehicle during seat adjustment and operable when said first locking means is moved relative to said automatic locking tether means with said tether means gripping said web during a crash, holding said frame relative to said vehicle to isolate said passenger from seat force and wherein:
said automatic locking tether means includes a spring biased reel upon which said web is wound with said web extending outwardly therefrom past said gripping means and then fixedly fastened to said vehicle.

9. The passenger restraint of claim 8 wherein:

said automatic locking tether means includes a floor mount fixedly secured to said web which is flexible and taut and extends upwardly toward said seat frame.

10. An automatic locking tether for a vehicle seat to isolate a passenger restrained on the seat by a seat belt from seat force during a crash comprising:

a tether frame mounted to said seat;

belt receiving means movably mounted to said tether frame and operable to hold the seat belt restraining the passenger on the seat;

a web mounted to said vehicle and extending to said tether frame;

gripping means mounted to said tether frame and operable when in an unlocked state to allow relative motion between said web and said tether frame when said seat is moved relative to said vehicle during seat adjustment and having a locked state when said belt receiving means moves relative to said tether frame during a crash, with said gripping means gripping said web and holding said seat relative to said vehicle isolating the passenger on the seat from seat force;

a web mount fixedly mounted to said vehicle and fixedly attached to said web which is flexible and taut and which extends upwardly from said web mount to said gripping means; and, spring means receiving said web and operable to maintain said web in a taut condition as said frame is moved relative to said vehicle during seat adjustment; and wherein:

said gripping means includes a cam member pivotally mounted to said tether frame with said cam member having a first portion connected to said belt receiving means and a second portion located apart from said first portion, said gripping means further includes a gripping pad mounted to said second portion and a web guide to route said web past said gripping pad, said gripping means operable when said belt receiving means exerts passenger load on said cam member to move said cam member forcing said gripping pad against said web holding said web stationary on said web guide and anchoring said tether with seat to said vehicle.

11. An automatic locking tether for a vehicle seat to isolate a passenger restrained on the seat by a seat belt from seat force during a crash comprising:

a tether frame mounted to said seat;

belt receiving means movably mounted to said tether frame and operable to hold the seat belt restraining the passenger on the seat;

a web mounted to said vehicle and extending to said tether frame;

gripping means mounted to said tether frame and operable when in an unlocked state to allow relative motion between said web and said tether frame when said seat is moved relative to said vehicle during seat adjustment and having a locked state when said belt receiving means moves relative to said tether frame during a crash, with said gripping means gripping said web and holding said seat relative to said vehicle isolating the passenger on the seat from seat force;

a web mount fixedly mounted to said vehicle and fixedly attached to said web which is flexible and taut and which extends upwardly from said web mount to said gripping means; and, spring means receiving said web and operable to maintain said web in a taut condition as said frame is moved relative to said vehicle during seat adjustment; and wherein:

said spring means includes a spring biased reel rotatably mounted to said tether frame and having said web wound thereon.

12. The automatic locking tether of claim 11 wherein:

said gripping means includes additional spring means extending between said cam member and said pad and operable to hold same together but yieldable to allow said pad to move relative to said cam member to be aligned relative to said web, said gripping means further includes further spring means located between said cam member and said belt receiving means and operable to normally urge said cam member away from said web but yieldable under load from said belt receiving means to allow said cam member to move toward said web and force said web to lockingly engage said web.

13. An automatic locking tether for a vehicle seat to isolate a passenger restrained on the seat by a seat belt from seat force during a crash comprising:

a tether frame mounted to said seat;

belt receiving means movably mounted to said tether frame and operable to hold the seat belt restraining the passenger on the seat;

a web mounted to said vehicle and extending to said tether frame; and, gripping means mounted to said tether frame and operable when in an unlocked state to allow relative motion between said web and said tether frame when said seat is moved relative to said vehicle during seat adjustment and having a locked state when said belt receiving means moves relative to said tether frame during a crash, with said gripping means gripping said web and holding said seat relative to said vehicle isolating the passenger on the seat from seat force, said gripping means including movable means pivotally mounted to said tether frame with said movable means having a first portion connected to locking means and a second portion located apart from said first portion, said gripping means operable when said locking means exerts passenger load on said movable means to move said second portion forcing said second portion against said web holding said web stationary and anchoring said tether with seat to said vehicle.

* * * * *